United States Patent
Hamaguchi et al.

(10) Patent No.: US 6,720,070 B2
(45) Date of Patent: Apr. 13, 2004

(54) HYDROPHILIC POLYESTER FIBER AND HYDROPHILIC NONWOVEN FABRIC USING THE SAME AND THEIR PRODUCTION

(75) Inventors: Tadaaki Hamaguchi, Osaka (JP); Hiroshi Maruyama, Iwakuni (JP); Shigeki Tanaka, Ohtsu (JP); Hisao Nishinaka, Osaka (JP)

(73) Assignee: Toyo Boseki Kabushiki Kaisha (JP)

( * ) Notice: Subject to any disclaimer, the term of this patent is extended or adjusted under 35 U.S.C. 154(b) by 0 days.

(21) Appl. No.: 09/844,660

(22) Filed: Apr. 27, 2001

(65) Prior Publication Data

US 2002/0031968 A1 Mar. 14, 2002

(30) Foreign Application Priority Data

Apr. 28, 2000 (JP) ......... 2000-130887
Apr. 28, 2000 (JP) ......... 2000-130888

(51) Int. Cl.[7] .......... B32B 19/00; D02G 3/00
(52) U.S. Cl. ......... 428/357; 428/364; 428/365; 428/373; 428/374
(58) Field of Search .......... 428/357, 364, 428/365, 373, 374; 442/118, 119

(56) References Cited

U.S. PATENT DOCUMENTS 3,416,952 A * 12/1968 McIntyre et al. .......... 428/482
4,027,346 A * 6/1977 Wada et al. .......... 428/375
5,262,460 A * 11/1993 Suzuki et al. .......... 525/411
5,942,176 A * 8/1999 Fujii et al. .......... 525/408

FOREIGN PATENT DOCUMENTS

| EP | 0209775 A1 | 1/1987 |
|---|---|---|
| GB | 1088984 | 10/1967 |
| JP | 57-386 | 1/1982 |
| JP | 59-211676 | 1/1984 |
| JP | 59-47476 | 3/1984 |
| JP | 61108768 | 5/1986 |
| JP | 62-19165 | 1/1987 |
| JP | 63-12897 | 3/1988 |
| JP | 63227874 | 9/1988 |
| JP | 7003637 | 1/1995 |

* cited by examiner

Primary Examiner—Elizabeth M Cole
Assistant Examiner—Jeremy R. Pierce
(74) Attorney, Agent, or Firm—Kenyon & Kenyon

(57) ABSTRACT

A hydrophilic polyester fiber is supplied with an aqueous mixed dispersion on the surface and made hydrophilic by being heated at 35° C. or higher, and the aqueous mixed dispersion employed contains a polyester-polyether block copolymer composed of a polyester component and a polyether component and is stable at lower than 35° C. and precipitates the polyester-polyether block copolymer when its dispersion state is broken by being heated to 35° C. or higher.

17 Claims, 1 Drawing Sheet

HYDROPHILIC POLYESTER FIBER AND HYDROPHILIC NONWOVEN FABRIC USING THE SAME AND THEIR PRODUCTION

BACKGROUND OF THE INVENTION

1. Field of the Invention

The present invention relates to a hydrophilic polyester fiber, a hydrophilic nonwoven fabric of the polyester fiber, and their production and more particularly relates to a polyester type fiber having durable hydrophilicity and possible of keeping the hydrophilicity even if being formed into a nonwoven fabric by entangling the fiber by, for example, a water jet entangling method, a hydrophilic nonwoven fabric of the polyester fiber, and their production method.

2. Description of the Related Art

Owing to relatively excellent properties, the polyester represented with poly (ethylene terephthalate) has been used in a wide range of fields for materials for clothes and domestic and industrial various materials as well. Especially, in the textile industry, owing to the excellent physical and chemical properties and economical properties, the polyester has widely been used as a raw material for woven fabrics and nonwoven fabrics.

However, the polyester type fiber is a hydrophobic fiber and has disadvantages that the fiber is easy to be electrically charged and that the fiber is not provided with hydrophilicity. In order to improve such disadvantages, a variety of methods have been proposed. That is, a method (disclosed in Japanese Patent Publication No. 63-12897(1988)) for obtaining a block copolymer by adding a specified phosphorus compound, a hydrophilic substance, at the period of polymerization of a polyester, a method (disclosed in Japanese Patent Application Laid-Open No. 59-211676(1984)) by adding a hydrophilic substance at the time of spinning, a method (disclosed in Japanese Patent Publication No. 57-386(1982)) by graft-polymerizing a hydrophilic substance with the surface of a fiber, a method (disclosed in Japanese Patent Application Laid-Open No. 59-47476 (1984)) for treating fibers with low temperature plasma, a method (disclosed in Japanese Patent Application Laid-Open No. 62-19165(1987)) by sticking an aqueous dispersion of a polyester ether copolymer containing a hydrophilic group to the surface of a fiber, and the like.

However, the methods by adding hydrophilic substances or graft polymerization have defective points, for example, that the properties of a polyester fiber are sometimes deteriorated and that the productivity is sometimes worsened. Further, the method by sticking an aqueous dispersion of a polyester ether copolymer containing a hydrophilic group to the surface of a fiber, the durability of the hydrophilicity is insufficient. Therefore, the polyester ether copolymer on the fiber surface is parted from the surface and cannot keep the hydrophilicity by the entangling treatment with high pressure water jet or being immersed just like a hand towel in water or an aqueous solution for a long duration.

In case of a nonwoven fabric, although it is possible to produce a hydrophilic nonwoven fabric by mixing a hydrophilic fabric, for example, rayon and bleached cotton, such as method has disadvantages that a bulky nonwoven fabric can not be obtained, the productivity is low, the cost is high and the like.

SUMMARY OF THE INVENTION

The object of the present invention is to provide a hydrophilic polyester type fiber having highly durable hydrophilicity as compared with a fiber produced by a conventional method and possible of keeping the hydrophilicity even in case of entangling treatment with high pressure water jet and in case of being immersed in water or an aqueous solution for a long duration, to provide a nonwoven fabric using the fiber, and to provide economical methods for producing these fiber and fabric.

The characteristic constitution of the hydrophilic polyester fiber relevant to the present invention is that the fiber is made hydrophilic by supplying an aqueous mixed dispersion to the surface and then heating the resultant fiber to 35° C. or higher: and the aqueous mixed dispersion contains a polyester-polyether block copolymer which is a copolymer of a polyester component and a polyether component and is stable at a temperature lower than 35° C. but if the dispersion is heated to 35° C. or higher, its dispersion state is broken to precipitate the polyester-polyether block copolymer.

With such a constitution, it is made possible to economically provide a hydrophilic polyester fiber having highly durable hydrophilicity as compared with a fiber produced by a conventional method and possible of keeping the hydrophilicity even in case of entangling treatment with high pressure water jet and in case of being immersed in water or an aqueous solution for a long duration.

The foregoing polyester-polyether block copolymer is preferably produced by copolymerization of an aromatic dicarboxylic acid, an aliphatic dicarboxylic acid, or an ester derivative of them as an acid component and polyoxyalkylene glycol or its derivative with 500 or higher number average molecular weight as a polyether component in 5 to 150 wt. % ratio to the polyester.

Further, the foregoing polyester-polyether block copolymer is preferably added in 0.05 to 2.0 parts by weight to 100 parts by weight of the fiber.

Further, the aqueous mixed dispersion contains an anionic surfactant and a cationic surfactant other than the polyester-polyether block copolymer and also a nonionic surfactant and/or an amphoteric surfactant, and is preferable to produce ion complexes when being heated and to break the dispersion state.

Further, the foregoing polyester fiber is preferably a polyester containing mainly ethylene terephthalate unit.

Further, the foregoing polyester fiber is preferably a fiber composed of two kinds of polyesters having melting points or softening points different from each other by at least 20° C. and forming a core-sheathed type or side by side type conjugate.

The characteristics of the hydrophilic nonwoven fabric relevant to the present invention are that a fiber web containing 20 wt. % or more of a hydrophilic polyester fiber is entangled by at least one of the following entangling methods; a needle punching method, a stitch bonding method, a thermal bonding method, and a water jet entangling method; that the foregoing hydrophilic polyester fiber is made hydrophilic by applying an aqueous mixed dispersion to the surface and then heating the resultant fiber at 35° C. or higher; and that the foregoing aqueous mixed dispersion contains a polyester-polyether block copolymer which is a copolymer of a polyester component and a polyether component and is stable at a temperature lower than 35° C. but if being heated to 35° C. or higher, its dispersion state is broken to precipitate the polyester-polyether block copolymer.

With such characteristics, it is made possible to economically provide a hydrophilic nonwoven fabric having highly durable hydrophilicity and possible of keeping the hydrophilicity even in case of entangling treatment with high pressure water jet and in case of being immersed in water or an aqueous solution for a long duration.

Further, the foregoing hydrophilic nonwoven fabric preferably has basis weight of 20 to 2000 g/m$^2$ and the water absorption 3 minutes after measurement by Larose method of 30 wt. % on the basis of the nonwoven fabric weight.

Further, in the foregoing hydrophilic nonwoven fabric, it is preferable that the foregoing polyester-polyether block copolymer is deposited on the surface of a long fiber having a fiber diameter of 0.5 to 40 µm and of which 80 wt. % or more is the foregoing polyester component.

Further, in the foregoing hydrophilic nonwoven fabric, the foregoing polyester-polyether block copolymer is preferably composed of an aromatic dicarboxylic acid and/or an aliphatic dicarboxylic acid as an acid component and polyoxyalkylene glycol or its derivative with 500 or higher number average molecular weight as a polyoxyalkylene glycol component and the copolymerization ratio of the foregoing polyoxyalkylene glycol component is in 5 to 150 wt. % ratio to the total polymer weight.

Further, in the foregoing hydrophilic nonwoven fabric, the foregoing polyester-polyether block copolymer is preferably added in 0.05 parts by weight or higher to 100 parts by weight of the nonwoven fabric.

Further, in the foregoing hydrophilic nonwoven fabric, the foregoing mixed dispersion is preferable to further contain an anionic surfactant and a cationic surfactant and also a nonionic surfactant and/or an amphoteric surfactant and is preferable to produce ion complexes when being heated and to break the dispersion state.

Further, the foregoing hydrophilic nonwoven fabric preferably has basis weight of 100 to 2000 g/m$^2$ and made of a long fiber made durably hydrophilic for civil engineering by a needle punching process.

Further, the foregoing hydrophilic nonwoven fabric preferably has basis weight of 30 to 300 g/m$^2$ and made of a long fiber made durably hydrophilic for civil a filter by being integrated by thermal fusion.

The method for producing a hydrophilic polyester fiber relevant to the present invention has the following characteristic: the method is for providing hydrophilicity by supplying an aqueous mixed dispersion to the surface and heating at 35° C. or higher and the aqueous mixed dispersion contains a polyester-polyether block copolymer, which is a copolymer of a polyester component and a polyether component, is stable at a temperature lower than 35° C. but if being heated to 35° C. or higher, its dispersion state is broken to precipitate the polyester-polyether block copolymer.

Further, in the foregoing method for producing a hydrophilic polyester fiber, the foregoing polyester-polyether block copolymer is preferably produced by copolymerization of an aromatic dicarboxylic acid, an aliphatic dicarboxylic acid, or an ester derivative of them as an acid component and polyoxyalkylene glycol or its derivative with 500 or higher number average molecular weight as a polyether component in 5 to 150 wt. % ratio to the polyester.

The method for producing a hydrophilic polyester type nonwoven fabric relevant to the present invention has the following characteristic: the method comprises steps of supplying an aqueous mixed dispersion, which is stable at a temperature lower than 35° C. but if being heated to 35° C. or higher, its dispersion state is broken to precipitate the polyester-polyether block copolymer, to a nonwoven fabric containing at least 80 wt. % of a polyester fiber and heating at 35° C. or higher.

By such a constitution, it is made possible to economically provide a method for producing a hydrophilic polyester type nonwoven fabric having highly durable hydrophilicity and possible of keeping the hydrophilicity even in case of entangling treatment with high pressure water jet and in case of being immersed in water or an aqueous solution for a long duration.

Further, in the foregoing method for producing a hydrophilic polyester type nonwoven fabric, the polyester-polyether block copolymer is preferably produced by copolymerization of an aromatic dicarboxylic acid, an aliphatic dicarboxylic acid, or an ester derivative of them as an acid component and polyoxyalkylene glycol or its derivative with 500 or higher average molecular weight as a polyether component in 5 to 150 wt. % ratio to the polyester.

Further, in the foregoing method for producing a hydrophilic polyester type nonwoven fabric, 0.05 parts by weight or more of the polyester-polyether block copolymer is preferably added to 100 parts by weight of the nonwoven fabric.

Further, in the foregoing method for producing a hydrophilic polyester type nonwoven fabric, the foregoing aqueous mixed dispersion contains an anionic surfactant and a cationic surfactant other than the polyester-polyether block copolymer and also a nonionic surfactant and/or an amphoteric surfactant, and is preferable to produce ion complexes when being heated and to break the dispersion state.

Further, in the foregoing method for producing a hydrophilic polyester type nonwoven fabric, the foregoing nonwoven fabric containing at least 80 wt. % of the polyester fiber is produced by entangling a fiber by a water jet entangling method.

Further, in the foregoing method for producing a hydrophilic polyester type nonwoven fabric, the foregoing nonwoven fabric containing at least 80 wt. % of the polyester fiber is produced by spunbonding.

DETAILED DESCRIPTION OF THE PREFERRED EMBODIMENTS

Figure 1:
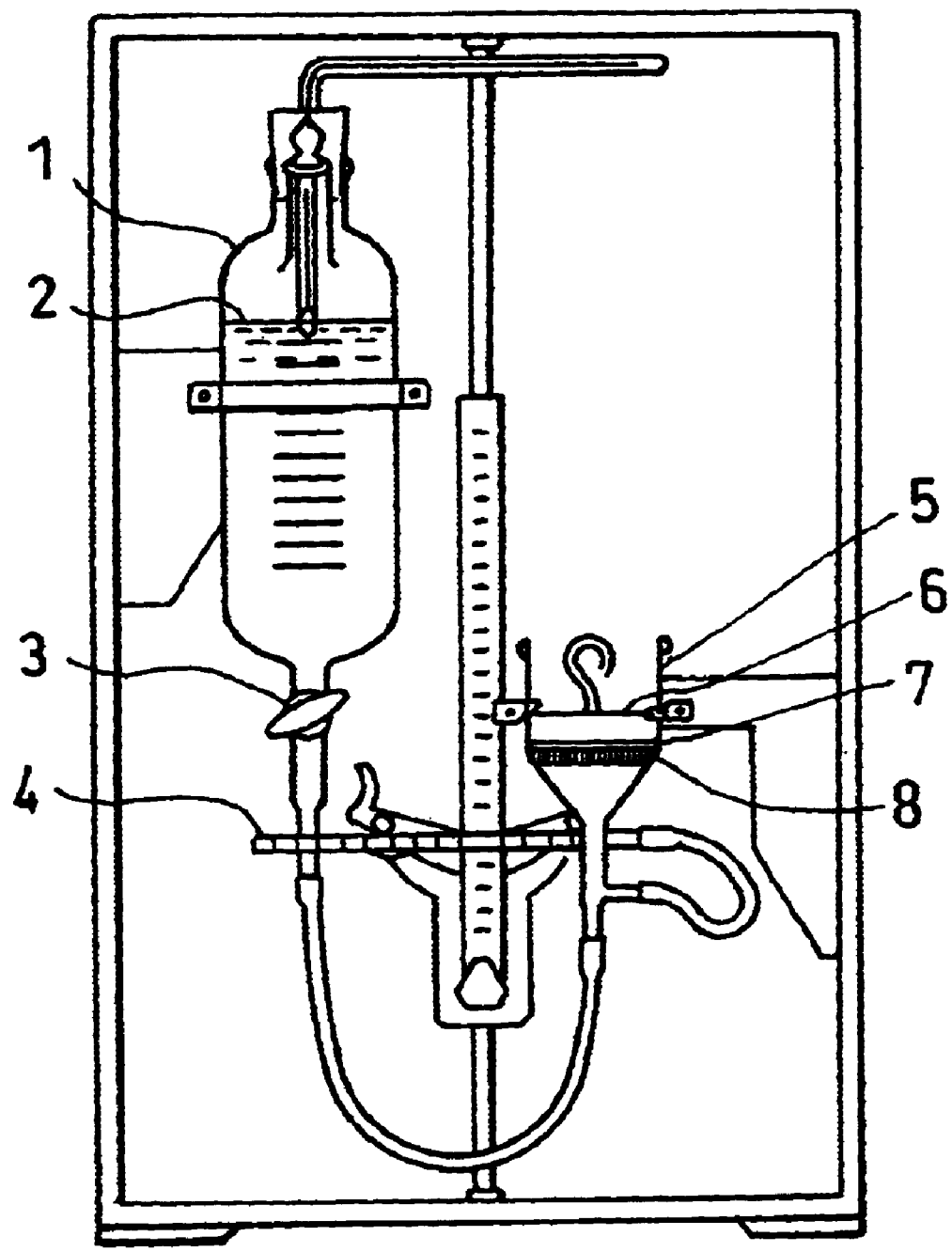
FIG. 1 is a schematic figure of an apparatus for measuring the water absorption by the Larose method employed for evaluation in the present invention.

The present invention will be made more apparent by the following description.

A polyester fiber to be employed for the present invention is preferably a polyester containing mainly an ethylene terephthalate monomer unit and more preferably a polyethylene terephthalate. As the polyester, preferable are copolymers produced by copolymerization of 50 wt. % of more of terephthalic acid as an acid component and other than that, one or more of isophthalic acid, diphenylsulfone dicarboxylic acid, sodium 3,5-dicarboxydibenzenesulfonate, naphthalene dicarboxylic acid, and the like. On the other hand, as the polyester, preferable glycol components composing the polyester by copolymerization are 70 wt. % or more of ethylene glycol and other than that, one or more of diethylene glycol, butanediol, cyclohexanedimethanol, neopentyl glycol, and the like. These polyester may be formed in a fiber solely or in a core-sheathed type or a side by side type conjugate of polyesters having at least 20° C. difference in melting points or softening points. If necessary, the polyester fibers may contain a delustant, a pigment, an anti-bacterial agent, an aromatic agent, and the like, Further, the polyester fibers may have any cross-section shape; round, hollow and round, irregular, hollow and irregular shapes and the like; without any restriction.

A nonwoven fabric of the present invention is composed of one or more types of the foregoing polyester fibers in 80 to 100 wt. % and fibers other than the polyesters in 0 to 20 wt. %. As the fibers other than polyester, examples are synthetic fibers such as polyethylene, polypropylene, nylon, acrylic fibers, and the like and conjugate fibers such as polyethylene-polypropylene, polypropylene/polypropylene, and the like, and these fibers may be used solely or in combination of two or more of them. Further, there is no restriction to use composite nonwoven fabrics produced by laminating nonwoven fabrics using a plurality of materials, by a plurality of production methods, and having different densities, thicknesses and the like. A polyester-polyether block copolymer component to be used for the present invention is firmly stuck especially to the polyester fibers and if the ratio of the polyester component is less than 80 wt. %, the primary hydrophilicity is high but the durability is deteriorated.

A nonwoven fabric to be used in the present invention is produced by a conventionally well known spunbonding method or melt blowing method. The nonwoven fabric may be used while being made to be a composite by laminating a nonwoven fabric obtained using a carded web, an air-laid web, or wet spun web by a needle punching method, a stitch bonding method, a thermal bonding method, a resin bonding method, a water jet entangling method, and the like.

As the acid component of the forgoing polyester-polyether block copolymer, terephthalic acid is mainly used, and other than that, an aromatic dicarboxylic acid, an aliphatic dicarboxylic acid, or an ester derivative of them may be used solely or as a mixture of 2 or more of them. More particularly, usable ones are aromatic dicarboxylic acids such as isophthalic acid, naphthalene dicarboxylic acid, diphenyldicarboxylic acid, diphenylsulfone dicarboxylic acid, sodium 3,5-dicarboxydibenzenesulfonate and the like; aliphatic dicarboxylic acids such as oxalic acid, adipic acid, sebacic acid, azelaic acid, hexahydroterephthalic acid and the like; and also dialkyl esters such as dimethyl esters and diethyl esters of these acids.

As the glycol component of the polyester-polyether block copolymer, usable ones are ethylene glycol, butane diol, pentane diol, hexane diol, cyclohexane dimethanol, neopentyl glycol, diethylene glycol, hydroquinone and the like and they may be used solely or as a mixture of 2 or more of them.

Further, as the copolymer component of polyoxyalkylene glycol and/or its derivatives, which is the ether component, usable ones are polyoxyalkylene glycols such as random or block copolymers of polyethylene glycol, polypropylene glycol, ethylene oxide and propylene oxide; polyoxyalkylene glycols terminated with hydroxy groups in both end groups such as block copolymers obtained by addition polymerization of ethylene oxide to polytetramethylene glycol; and polyoxyalkylene glycol derivatives such as methoxypolyethylene glycol, phenoxypolyethylene glycol, sodium sulfophenoxypolyethylene glycol whose one terminals are terminated by ether bonding. These polyoxyalkylene glycol compounds may be used solely or as a mixture of 2 or more of them.

The number average molecular weight of the foregoing polyoxyalkylene glycol compound is 500 or higher and preferably within a range from 800 to 5000. If the average molecular weight is less than 500, sufficient hydrophilicity cannot be obtained. The polyoxyalkylene glycol compound is copolymerized in 5 to 150 wt. %, preferably 40 to 130 wt. % ratio. If the ratio is less than 5 wt. %, the dispersibility in water is insufficient and consequently emulsification and dispersion is made difficult and no sufficient hydrophilicity is obtained. If the ratio is 150 wt. % or higher, the compatibility with the polyester fibers is lowered and hydrophilicity becomes too high to result in deterioration of the durability of the hydrophilicity.

In the present invention, it is preferable to add the foregoing polyester-polyether block copolymer in 0.05 to 2.0 parts by weight, more preferably 0.1 to 1.0 parts by weight to 100 parts by weight of the fiber. If the ratio of the polyester-polyether block copolymer is less than 0.05 parts by weight, sufficient hydrophilicity and its durability cannot be obtained sufficiently and on the other hand, if the ratio is 2.0 parts by weight or more, the fiber surface becomes sticky and the processability at the duration of nonwoven fabric production is worsened.

As a sold product of a modified polyester type resin of the foregoing polyester-polyether block copolymer, available are SR-1000, SR-1800, SR-6200, SR-5000 (trade names) produced by Takamatsu Yushi Co., Ltd.

The aqueous mixed dispersion to be supplied to the polyester fiber of the present invention contains an anionic surfactant and a cationic surfactant other than the polyester-polyether block copolymer and also a nonionic surfactant and/or an amphoteric surfactant. Generally, if an anionic surfactant and a cationic surfactant are mixed, ion complexes are easily formed and precipitated. However, if a prescribed amount of a nonionic surfactant and/or an amphoteric surfactant is added to at least one of the anionic surfactant and the cationic surfactant, both surfactants are stable in a low temperature region and do not form ion complexes.

When the polyester-polyether block copolymer is added to the foregoing aqueous mixed dispersion kept at 35° C. or lower and supplied to a polyester fiber and then the polyester fiber is heated to 35° C. or higher, the anionic surfactant and the cationic surfactant form ion complexes. Then, dispersion break (coagulation) takes place and simultaneously the polyester-polyether block copolymer is precipitated to be firmly fixed in the surface of the polyester fiber and a hydrophilic polyester fiber is thus obtained. Further, since the produced ion complexes are firmly fixed in both of the polyester fiber and the polyester-polyether block copolymer, the durability of the obtained hydrophilicity is extremely enhanced. Well-known surfactants can be used as the anionic surfactant, the cationic surfactant, the nonionic surfactant, and the amphoteric surfactant and one or more types of these surfactants may be used while being mixed.

As the anionic surfactant, examples are of carbonic acid salts, sulfonic acid salts, sulfuric acid ester salts, phosphoric acid ester salts and the like. More particularly, they are higher aliphatic acid soaps, polyoxyethylene alkyl ether carboxylic acid salts, sodium alkylbenzenesulfonate, sodium oleic acid amide sulfonate, sodium dialkylsulfosuccinate, higher alcohol sulfuric acid ester salts, polyoxyethylene alkyl ether sulfuric acid salts, alkyl phosphoric acid salt, polyoxyethylene alkyl ether phosphoric acid salts and the like.

As the cationic surfactant, examples are aliphatic amine salts and quaternary ammonium salts, aromatic quaternary ammonium salts, heteroring quaternary ammonium salts and the like and more particularly, they are aliphatic amines, aliphatic quaternary ammonium salts, alkylpyridinium salts, alkylisoquinolinium salts, benzethonium salts and the like.

As the nonionic surfactant, examples are of ether type, ester type, ether ester type, and nitrogen-containing type. More particularly, they are polyoxyethylene alkyl ether, polyoxyethylene polyoxypropylene block copolymer, polyoxyethylene aliphatic acid ester, polyoxyethylene alkylphenyl ether, polyalcohol aliphatic acid ester, polyoxyethylene polyalcohol aliphatic acid ester, sucrose aliphatic acid ester and the like.

As the amphoteric surfactant, examples are betaine type, aminocarboxylic acid salts, imidazoline derivatives and the like. More particularly, they are alkyldimethylbetaine, alkyldiethylenetriamine acetic acid, alkylmethylaminocarboxylic acid salts and the like.

The amounts of these surfactants to be used are properly set and in general, 5 to 200 wt. %, preferably 10 to 100 wt. %, respectively to the polyester-polyether block copolymer.

Hereinafter, an example of a practical method for producing the aqueous mixed dispersion will be described, however the present invention is not restricted to the example. A polyester-polyether block copolymer is mixed with at least one of aqueous dispersions containing an anionic surfactant and a cationic surfactant, respectively, to produce aqueous dispersions containing the polyester-polyether block copolymer. Further, a nonionic surfactant and/or an amphoteric surfactant is added to at least one of the aqueous dispersions and these 2 kinds of aqueous dispersions are mixed and stirred at 35° C. or lower, preferably at 25° C. or lower.

If necessary, an anti-bacterial agent, an oxidation preventing agent, a rot-proofing agent, an antistatic agent and the like may be added to the produced aqueous mixed dispersion.

As described above, while being kept at 35° C. or lower, the produced aqueous mixed dispersion is supplied to the surface of the polyester fiber in the foregoing ratio. A variety of methods, such as an immersion method, a spray method, a roller method, and the like may be employed for the application method. Before the aqueous mixed dispersion is supplied, another surfactant may be supplied. The polyester fiber bearing the aqueous mixed dispersion is then heated at 35° C. or higher, more preferably 50° C. or higher, and then dried to obtain the hydrophilic polyester fiber of the present invention.

A fiber web containing 20 wt. % or higher, preferably 30 wt. % or higher, of the hydrophilic polyester fiber of the present invention is produced and fibers are entangled by a variety of method to obtain the hydrophilic nonwoven fabric. Further, the foregoing fiber web and a hydrophobic synthetic fiber web are laminated and fibers are entangled in the same manner to obtain a nonwoven fabric having hydrophilicity only in one side. If the content of the hydrophilic polyester fiber of the present invention is 20 wt. % or lower, sufficient hydrophilicity cannot be obtained and thus it is not preferable.

Regarding the fiber web, a variety of fibers may be used as the fibers to be mixed with the hydrophilic polyester fiber. That is, natural fibers such as cotton, bleached cotton, silk and the like; regenerated cellulose fibers such as rayon, polynosic and the like; and synthetic fibers such as polyester, polypropylene, nylon, acrylic fiber and the like and one or more of these fibers are added in 0 to 80 wt. %. Generally, the natural fibers and the regenerated fibers have excellent hydrophilicity. By mixing the hydrophilic polyester fiber of the present invention with these fibers, properties, e.g. bulkiness, strength, evenly mixed property, processability can be improved without deteriorating the hydrophilicity.

A variety of methods, e.g. a needle punching method, a thermal bonding method, a water jet entangling method, a resin bonding method, a stitch bonding method and the like, are applicable for the entangling method of the foregoing fiber web. The water jet entangling method is most preferable from the viewpoint of the properties of the hydrophilic polyester fiber of the present invention and other than that, the needle punching method, the thermal bonding method, the stitch bonding method are preferable. The resin bonding method is less preferable since the resin to be used for entangling the fibers adheres to the surface of the fibers to result in deterioration of the hydrophilicity.

Further, the hydrophilic polyester type nonwoven fabric of the present invention can be obtained by applying the aqueous mixed dispersion kept at 35° C. or lower, produced in the above described manner to a previously produced polyester type nonwoven fabric in the above described ratio. Application methods applicable are an immersion method, a suction method, a spraying method and the like. Another surfactant may be supplied before the application of the aqueous mixed dispersion. The hydrophilic polyester type nonwoven fabric can be obtained by successively heating and drying the polyester type nonwoven fabric bearing the aqueous mixed dispersion at 35° C. or higher, preferably at 50° C. or higher.

A nonwoven fabric of the present invention is suitable to be used for civil engineering use and for filters. For the civil engineering use, a relatively bulky needle-punched nonwoven fabric with basis weight of 100 to 2000 $g/m^2$ is especially suitable. Owing to the above described hydrophilicity, the water discharging function and water-absorbing function are significantly improved, so that the nonwoven fabric is significantly desirable. The aqueous mixed dispersion to be employed for the present invention and in which the polyester-polyether block copolymer is to be precipitated works as a lubricant for the needle punching and lowers the friction between the fibers and needles, so that the break of the needles during the needle punching can be suppressed. Consequently, the nonwoven fabric of the present invention is especially suitable for the nonwoven fabric for civil engineering, for which needle punched fabrics easy to break the needles owing their high basis weight have widely been used.

In case of using a nonwoven fabric of the present invention for filters, the fabric provides a low flow resistance of a fluid when being used as a liquid filter and enables filtration operation at a low energy and thus the nonwoven fabric is preferable. As a liquid filter, it is required for the fibers to be firmly stuck to one another since the fibers receive a rather high shearing force at the time when a liquid flows through the nonwoven fabric. If no binder is used, an embossing process or a calendering treatment is carried out at 35° C. or higher in order to stabilize the form by adhesion and especially for this use purpose, such process and treatment are practically essential. Since the nonwoven fabric of the present invention enables the thermal bonding process and the above described process and treatment to be simultaneously carried out without requiring another process for precipitating the polyester-polyether block copolymer from the aqueous mixed dispersion, energy for producing the nonwoven fabric is saved and the nonwoven fabric is thus desirable.

In case of fixing fibers by thermal bonding, the gaps among fibers are narrowed to contribute to improvement of filtration performance, however it takes long for the polyester-polyether block copolymer to penetrate the inside of the fibers and subsequently, penetration in the inside is made difficult if the basis weight is heavy. Hence, the nonwoven fabric to be subjected to thermally bonding for filters is preferable to have basis weight in a range from 30 to 300 g/m². If the basis weight is less than 30 g/m², the filtration performance cannot be improved sufficiently even if the fiber diameter is made thin.

In case of using the nonwoven fabric as filters, if the fiber diameter is made thinner than about 6 μm, it becomes generally hard for water to penetrate the small holes formed among fibers and therefore the filtration precision tends to be deteriorated owing to the narrowed effective filtration surface area. However, the hydrophilic nonwoven fabric of the present invention causes no such a problem since it has high hydrophilicity and is possible to provide a high filtration precision. In the case where a melt blown nonwoven fabric of fibers with a small fiber diameter is used as a liquid filter, such an effect is especially significant and thus the present invention is significantly effective.

According to the foregoing description, the hydrophilic polyester fiber and the hydrophilic nonwoven fabric of the present invention have excellent hydrophilicity and durability of the hydrophilicity without deteriorating the intrinsic and excellent characteristics of polyesters. The hydrophilic nonwoven fabric using such a hydrophilic polyester fiber are useful for remarkably various use purposes e.g. a variety of sanitary materials such as paper diapers, top sheets and/or second sheets of sanitary napkins, wet wipes for wiping the buttocks, wet wipers for articles, wet tissues, kitchen paper, counter cloths, tray mats, drapes for surgery, clothes for surgery, a variety of filters such as coffee filter and the like, domestic products, food wrapping materials, drain materials civil engineering, and the like.

EXAMPLES

Hereinafter, practical examples will be described, however the present invention is not at all restricted to these examples.

Production of the Aqueous Mixed Dispersion

An emulsified dispersion was previously produced by mixing (a) a polyester-polyether block copolymer produced by copolymerizing 100 parts by weight of an ester component composed of 80 wt. % of terephthalic acid and 20 wt. % of isophthalic acid as acid components and ethylene glycol as a glycol component and 70 parts by weight of an ether component of polyoxyethylene laurylphenyl ether (the number average molecular weight 1100); (b) potassium laurylphosphate; (c) sodium dioctylsulfosuccinate; and (d) polyoxyethylene alkyl ether.

On the other hand, an emulsified dispersion was produced by mixing (e) of a quaternary ammonium of a higher aliphatic acid amide and (f) of a polyoxyethylene alkylphenyl ether.

Those two types of emulsified dispersions were cooled to 25° C. or lower and then mixed to obtain an aqueous mixed dispersion. Finally, the concentration of (a) was controlled to be 10 wt. % and the ratios of (b) to (f) to 100 parts by weight of (a) were (b) 20 parts by weight, (c) 20 parts by weight, (d) 20 parts by weight, (e) 30 parts by weight, and (f) 20 parts by weight. The aqueous mixed dispersion was kept at 25° C. or lower until it was supplied to a polyester fiber.

Method for Measuring the Hydrophilicity of a Staple Fiber

A cotton ball of about 8 to 9 cm diameter was produced from 1 g of a staple fiber fabrillated by a roller carding machine. Pure water was poured in a beaker of 500 ml and the cotton ball was put still on the surface of pure water and the time by seconds taken for the cotton ball to completely subside into water was measured. The primary hydrophilicity was measured by the staple fiber itself and the second hydrophilicity was measured by lightly squeezing and drying the staple fiber after the primary hydrophilicity measurement and then measuring the hydrophilicity again. Further, the hydrophilicity durability was measured using a staple fiber prepared by putting 2 g of the staple fiber fabrillated by a roller carding machine and 200 ml of pure water together in a wide-opened bottle of 200 ml, shaking the bottle at 2 Hz for 30 minutes by a shaking apparatus, rinsing the fiber further with 200 ml of pure water, and then drying the fiber.

Carding Machine Processability

A roughly fabrillated staple fiber was evaluated based on the following standards at the time of producing a web from the fiber by a roller carding machine (produced by Yamato Machinery Co., Ltd.) of 20 cm width.

○: There were 5 neps/g or less. Not less than 95% of the loaded amount of the fiber was formed into a web. Further, approximately even web was produced.

Δ: There were 5 to 20 neps/g. About 85 to 95% of the loaded amount of the fiber was formed into a web. Further, although uneven, a web could be produced.

X: There were 20 neps/g or more. Not more than 85% of the loaded amount of the fiber was formed into a web or no web could be produced since the fiber could not continuously be fed.

Water Absorption by Larose Method

Water absorption measurement was carried out using an apparatus for measuring the water absorption by the Larose method as illustrated in FIG. 1 (produced by Toyobo engineering Co., Ltd.). That is, the cock 3 positioned in the lower part of the water supply container 1 of the apparatus was opened to fill the water absorption measurement tube 4 up to the tip with pure water 2 at 20° C. and at the same time to immerse the glass filter 8, which was positioned in the water supply testing part 5, up to the upper face with water and then the cock 3 was closed. Further, excess water was taken out by bringing filter paper into contact with the upper face of the glass filter 8 and at the same time the gauge indication of the water absorption measurement tube 4 was adjusted to be zero. After that, a measurement specimen 7 with the diameter of 6 cm was calmly put on the upper face of the glass filter and immediately a weight with the diameter of 6 cm and made of brass was put thereon and the lapse of time was simultaneously measured. The gauge of the water absorption measurement tube 4 after 3 minutes was read out to measure the absorbed water amount. The water absorption was calculated from the following equation:

Water absorption (wt. %) by the Larose method=100×absorbed water amount (ml=g)/the weight of the specimen (g).

Water Droplet Absorption

A nonwoven fabric to be subjected to measurement was put on filter paper and water droplets of each 0.2 ml at 20° C. were titrated from 1 cm height. Droplets were titrated one by one to 50 points and the ratio of the water droplets absorbed on the nonwoven fabric was measured.

Thickness of Nonwoven Fabric

The thickness was measured by applying load of 3 g/cm² using a measurement plate with the diameter of 2 cm.

Method for Evaluating Durability of Hydrophilicity

An nonwoven fabric specimen of 10 cm×20 cm size crumpled up and 200 ml of water were put in a wide-opened bottle of 200 ml capacity and shaken at 1 Hz for 30 minutes by a shaking apparatus and then the nonwoven fabric was further rinsed with 200 ml of pure water and dried. Using the resultant nonwoven fabric specimen, the above described water absorption by Larose method and the water droplet absorption were measured and the durability was calculated from the obtained results and the water absorption by Larose method and the water droplet absorption before the treatment (the primary values) according to the following equation. Durability to the water absorption by Larose method (%)=100×the water absorption after the shaking treatment (wt. %)/the water absorption before shaking treatment (wt. %). Durability to the water droplet absorption (%)=100×the water absorption after the shaking treatment (%)/the water absorption before shaking treatment (%).

Examples 1 to 3

Comparative Examples 1 to 2

Poly(ethylene terephthalate) containing 0.5 wt. % of titanium dioxide as a delustant agent and having an intrinsic a viscosity of 0.610 (dl/g) was spun and elongated by an ordinary method to obtain a tow with single yarn denier of 1.7 dtex. The tow was curled and immersed in the foregoing aqueous mixed dispersion to apply the dispersion to the tow as to control the ratios as shown in Table 1 and then the resultant tow was heated for 5 minutes by a drier set at 130° C. and finally cut to obtain hydrophilic polyester staples of 51 mm.

Comparative Example 3

Polyester staples were obtained in the same manner as Example 1 except that the aqueous mixed dispersion used was an emulsified dispersion containing only the surfactants of (b), (c), and (d).

Comparative Example 4

Polyester staples were obtained in the same manner as Example 1 except that the aqueous mixed dispersion used was an emulsified dispersion containing only the surfactants of (a), (b), (c), and (d).

Example 4

The poly (ethylene terephthalate) used in Example 1 was used as a core component and a modified polyester produced by copolymerizing an ethylene terephthalate unit with isophthalic acid and diethylene glycol and having a softening point of 105° C. was used as a sheathing component and a conjugate tow with single yarn denier of 2.2 dtex was obtained by spinning and elongating the conjugate by an ordinary spinning method. The tow was curled and coated with the foregoing aqueous mixed dispersion by a spraying method to apply the dispersion as to control the ratios as shown in Table 1. The resultant tow was then heated for 10 minutes by a drier set at 50° C. Finally, the tow was cut to obtain hydrophilic and thermally adhesive polyester staples of 51 mm.

Examples 5 to 8

Comparative Examples 5 to 6

While the mixing ratio being controlled as shown in Table 2, webs were produced using the fibers produced in Example 2, Example 4, and Comparative Example 3 and then nonwoven fabrics with basis weight of 50 g/m² were produced by a water jet entangling method. The water jet entangling was carried out using 3 nozzles with the pore diameter of 0.1 mm and the pore pitches 0.8 mm while the water pressure of the respective nozzles being controlled to be 70 kg/cm² and the fiber webs on a net of 100 meshes made of a stainless steel being moved at 5 m/minutes and the opposite sides was also treated in the same manner. After that, drying was carried out at 120° C. for 10 minutes.

Example 9

A web was produced from a mixture of 50% of the fiber used for Example 2 and 50% of viscose rayon of 1.7 dtex and a nonwoven fabric having characteristics as shown in Table 3 was produced by the water jet entangling method in the same manner as Example 1.

Comparative Example 7

A nonwoven fabric having characteristics as shown in Table 3 was produced by the water jet entangling method in the same manner as Example 9 except that the fiber used for Example 2 was replaced with the fiber of Comparative Example 3.

Comparative Example 8

A nonwoven fabric having characteristics as shown in Table 3 was produced by the water jet entangling method in the same manner as Example 9 except that 100% of viscose rayon of 1.7 dtex was used.

The evaluation results of Examples 1 to 9 and of Comparative Examples 1 to 8 were shown in Tables 1 to 3.

The hydrophilic polyester fibers of the respective examples were found remarkably excellent in the durability of the hydrophilicity and card machine processability as compared with those of the comparative examples.

Examples 10 to 11

Comparative Example 9

Spunbonded nonwoven fabrics with basis weight of 130 g/m² produced from poly(ethylene terephthalate) filaments with single yarn denier of 3.5 dtex by entangling by a needle punching method were treated with the foregoing aqueous mixed dispersion by an immersion method. Roller pressing was carried out for the resultant nonwoven fabrics to squeeze the excess aqueous mixed dispersion as to control the adhesion ratios of the polyester-polyether block copolymer as shown in Table 4 and then the nonwoven fabrics were dried at 130° C. to obtain the polyester nonwoven fabrics.

Comparative Example 10

A polyester nonwoven fabric having characteristics shown in Table 4 was obtained in the same manner as Example 1 except that the aqueous mixed dispersion used was an emulsified dispersion containing only the surfactants of (b), (c), (d), (e), and (f). The ratios of the respective surfactants were controlled to be same as the foregoing aqueous mixed dispersion and the adhesion ratio to the nonwoven fabric was controlled to be 0.55 wt. %.

Comparative Example 11

A polyester nonwoven fabric having characteristics shown in Table 4 was obtained in the same manner as Example 1 except that the aqueous mixed dispersion used was an emulsified dispersion containing only the surfactants of (a), (b), (c), and (d).

Example 12

A polyester nonwoven fabric having characteristics shown in Table 4 was produced by the same process as that of Example 1 from a spunbonded nonwoven fabric with basis weight of 50 g/m², and embossed poly (ethylene terephthalate) with single yarn of the denier of 2.0 dtex.

Example 13

A polyester nonwoven fabric having characteristics shown in Table 4 was produced by the same process as that of Example 1 (except that drying was carried out by natural drying at a room temperature) from a nonwoven fabric with basis weight of 50 g/m², which was produced by entangling carded webs composed of 85 wt. % of poly(ethylene terephthalate) fiber of 1.7 dtex and 44 mm and 15 wt. % of a core-sheath type polyester-based thermo-adhesive fiber of 2.2 dtex and 51 mm by a water jet entangling method.

Comparative Example 12

The nonwoven fabric used for Example 13 was subjected to the measurement as it was without being subjected to the process of the present invention.

Comparative Example 13

A polyester nonwoven fabric having characteristics shown in Table 4 was produced by the same process as that of Example 13 from a nonwoven fabric with basis weight of 50 g/m², which was produced by entangling carded webs composed of 70 wt. % of poly (ethylene terephthalate) fiber of 1.7 dtex and 44 mm and 30 wt. % of a core-sheath type polyethylene-polypropylene thermo-adhesive fiber of 2.2 dtex and 51 mm by a water jet entangling method.

Example 14

A hydrophilic filament nonwoven fabric having characteristics shown in Table 4 was produced by the same process as that of Example 10 from a spunbonded nonwoven fabric of poly (ethylene terephthalate) with basis weight of 50 g/m², which was embossed with fiber diameter of 14 μm.

The evaluation results of the nonwoven fabrics of the above described Examples 10 to 14 and Comparative Examples 9 to 13 were shown in Table 4.

According to the results shown in Table 4, the hydrophilic nonwoven fabrics of the respective examples were found remarkably excellent in the hydrophilicity and the durability of the hydrophilicity.

TABLE 1

|  | Adhesion ratio of polyester-polyether copolymer (wt. %) | Primary hydrophilicity (second) | Secondary hydrophilicity (second) | Hydrophilicity durability (second) | Carding machine processability |
|---|---|---|---|---|---|
| Example 1 | 0.15 | 2.8 | 2.8 | 2.8 | ○ |
| Example 2 | 0.40 | 2.6 | 2.7 | 2.6 | ○ |
| Example 3 | 1.50 | 2.6 | 2.6 | 2.5 | Δ |
| Comparative Example 1 | 0.04 | 4.3 | 5.1 | 18.5 | ○ |
| Comparative Example 2 | 2.20 | 2.6 | 2.6 | 2.6 | X |
| Comparative Example 3 | 0 (0.25 for surfactant) | 3.1 | >600 | >600 | ○ |
| Comparative Example 4 | 0.40 | 2.8 | 7.5 | >600 | ○ |
| Example 4 | 0.25 | 2.6 | 2.6 | 2.8 | ○ |

TABLE 2

|  | Fiber ratio of Example 2 (wt. %) | Fiber ratio Example 4 (wt. %) | Fiber ratio of Comparative Example 3 (wt. %) | Water absorption by Larose method (wt. %) | Water droplet absorption (%) |
|---|---|---|---|---|---|
| Example 5 | 100 | — | 0 | 182 | 100 |
| Example 6 | 50 | — | 50 | 156 | 98 |
| Example 7 | 20 | — | 80 | 52 | 42 |
| Comparative Example 5 | 0 | — | 100 | 5 | 0 |
| Example 8 | — | 30 | 70 | 74 | 48 |
| Comparative Example 6 | — | 15 | 85 | 22 | 5 |

TABLE 3

|  | Basis weight (g/m²) | Thickness (mm) | Water absorption by Larose method (wt. %) | Water droplet absorption (%) |
|---|---|---|---|---|
| Example 9 | 45.0 | 0.75 | 245 | 100 |
| Comparative Example 7 | 45.6 | 0.76 | 145 | 78 |
| Comparative Example 8 | 48.1 | 0.48 | 230 | 100 |

TABLE 4

|  | Adhesion ratio of (a) (wt. %) | Water absorption by Larose method | | Water droplet absorption | |
|---|---|---|---|---|---|
|  |  | Primary absorption (wt %) | Durability (%) | Primary absorption (%) | Durability (%) |
| Example 10 | 0.5 | 210 | 96 | 100 | 100 |
| Example 11 | 1.5 | 248 | 105 | 100 | 100 |
| Comparative Example 9 | 0.04 | 25 | 42 | 34 | 88 |
| Comparative Example 10 | 0 | 148 | 0 | 100 | 0 |
| Comparative Example 11 | 0.5 | 185 | 10 | 100 | 16 |
| Example 12 | 0.5 | 130 | 100 | 100 | 100 |
| Example 13 | 0.5 | 190 | 92 | 100 | 100 |

TABLE 4-continued

| | | Water absorption by Larose method | | Water droplet absorption | |
|---|---|---|---|---|---|
| | Adhesion ratio of (a) (wt. %) | Primary absorption (wt %) | Durability (%) | Primary absorption (%) | Durability (%) |
| Comparative Example 12 | 0 | 0 | — | 0 | — |
| Comparative Example 13 | 0.5 | 175 | 56 | 100 | 46 |
| Example 14 | 0.5 | 140 | 140 | 100 | 100 |

What is claimed is:

1. A hydrophilic polyester fiber comprising:
   a polyester fiber; and
   a coating on the fiber comprising (a) a polyester-polyether block copolymer comprising a polyester component and a polyether component; (b) an ion complex comprising (i) an anionic surfactant and (ii) a cationic surfactant; and (c) at least one of a nonionic surfactant and an amphoteric surfactant.

2. The hydrophilic polyester fiber according to claim 1, wherein said polyester-polyether block copolymer comprises:
   an aromatic dicarboxylic acid, an aliphatic dicarboxylic acid, or their ester type derivatives as an acid components; and
   a polyoxyalkylene glycol with a number average molecular weight of 500 or higher or its derivative as said polyether component,
   wherein said polyester-polyether block copolymer is produced by copolymerizing 5 to 150 wt. % of said polyether component with said polyester component.

3. The hydrophilic polyester fiber according to claim 2, wherein 0.05 to 2.0 parts by weight of said polyester-polyether block copolymer is supplied to 100 parts by weight of said fiber.

4. The hydrophilic polyester fiber according to claim 1, wherein said polyester fiber is made of a polyester mainly containing an ethylene terephthalate unit.

5. The hydrophilic polyester fiber according to claim 1, wherein said polyester fiber is a core-sheathed type or side by side type conjugate of two kinds of polyesters having at least 20° C. difference in melting points or softening points.

6. A hydrophilic polyester fiber comprising:
   a polyester fiber; and
   a precipitate from an aqueous mixed dispersion on the surface of the polyester fiber,
   wherein said aqueous mixed dispersion contains (a) a polyester-polyether block copolymer composed of a polyester component and a polyether component, (b) an anionic surfactant, (c) a cationic surfactant, and (d) at least one of a nonionic surfactant and an amphoteric surfactant,
   wherein, when heated to 35° C. or higher, said aqueous mixed dispersion produces an ion complex, and said block copolymer and said ion complex produced from at least said anionic surfactant and said cationic surfactant precipitate on the fiber surface, wherein said dispersion adheres to said polyester fiber, making said polyester fiber hydrophilic.

7. The hydrophilic polyester fiber according to claim 6, wherein said polyester-polyether block copolymer comprises:
   an aromatic dicarboxylic acid, an aliphatic dicarboxylic acid, or their ester type derivatives as an acid component; and
   a polyoxyalkylene glycol with a number average molecular weight of 500 or higher or its derivative as said polyether component,
   wherein said polyester-polyether block copolymer is produced by copolymerizing 5 to 150 wt. % of said polyether component with said polyester component.

8. The hydrophilic polyester fiber according to claim 7, wherein 0.05 to 2.0 parts by weight of said polyester-polyether block copolymer is supplied to 100 parts by weight of said fiber.

9. The hydrophilic polyester fiber according to claim 6, wherein said polyester fiber is made of a polyester mainly containing an ethylene terephthalate unit.

10. The hydrophilic polyester fiber according to claim 6, wherein said polyester fiber is a core-sheathed type or side by side type conjugate of two kinds of polyesters having at least 20° C. difference in melting points or softening points.

11. The hydrophilic polyester fiber according to claim 6, wherein each of (b), (c), and (d) range form 5 to 200 wt % relative to said aqueous mixed dispersion.

12. The hydrophilic polyester fiber according to claim 6, wherein said aqueous mixed dispersion produces an ion complex at a temperature between 35° C. and 50° C.

13. A method for producing a hydrophilic polyester fiber comprising steps of:
   applying an aqueous mixed dispersion to the surface of the fiber, wherein said aqueous mixed dispersion comprises (a) a polyester-polyether block copolymer composed of a polyester component and a polyether component, (b) an anionic surfactant, (c) a cationic surfactant, and (d) at least one of a nonionic surfactant and an amphoteric surfactant, wherein said aqueous mixed dispersion is stable at lower than 35° C.; and
   heating the fiber to 35° C. or higher, thereby forming an ion complex comprising said anionic surfactant and said cationic surfactant and precipitating said polyester-polyether block copolymer and said ion complex on the fiber surface, thereby producing a hydrophilic polyester fiber.

14. The method for producing a hydrophilic polyester fiber according to claim 13, wherein said polyester-polyether block copolymer comprises:
   an aromatic dicarboxylic acid, an aliphatic dicarboxylic acid, or their ester type derivatives as an acid component; and
   a polyoxyalkylene glycol with a number average molecular weight of 500 or higher or its derivative as said polyether component,
   wherein said polyester-polyether block copolymer is produced by copolymerizing 5 to 150 wt. % of said polyether component with said polyester component.

15. The method according to claim 13, further comprising heating the fiber to between 35° C. and 50° C.

16. The method according to claim 13, wherein each of (b), (c), and (d) ranges of form 5° C. to 200 wt % relative to said block copolymer.

17. A hydrophilic polyester fiber prepared by the method of claim 13.

* * * * *